March 15, 1960   J. E. LILIENFELD   2,929,005
SEPARATOR MEANS FOR ELECTROLYTIC DEVICES
Filed Aug. 24, 1955
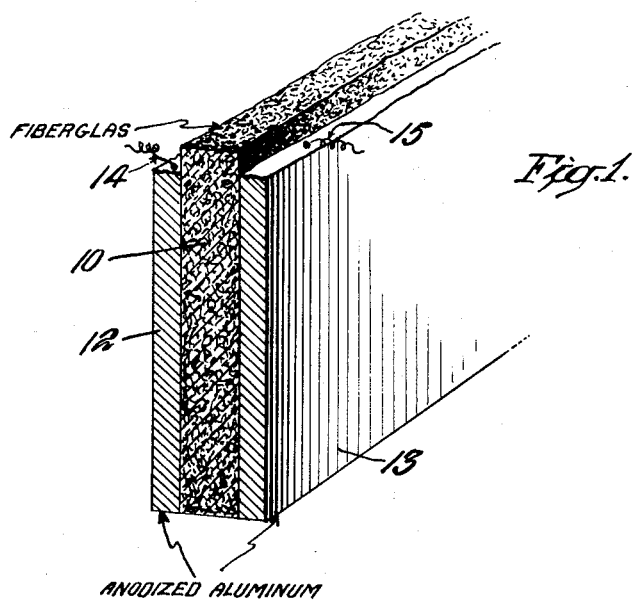
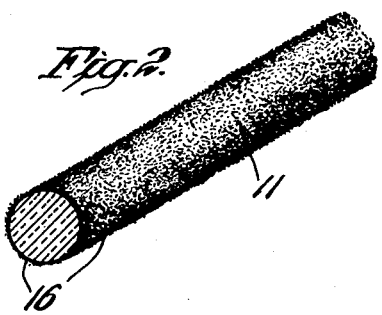
INVENTOR.
JULIUS EDGAR LILIENFELD
BY
ATTORNEY

2,929,005
SEPARATOR MEANS FOR ELECTROLYTIC DEVICES

Julius Edgar Lilienfeld, St. Thomas, Virgin Islands, assignor to Samuel D. Warren, Essex, and Ralph F. Burkard, Arlington, Mass.

Application August 24, 1955, Serial No. 530,270

13 Claims. (Cl. 317—230)

The invention relates to separator means for use in electrolytic devices; and, specifically, to electrically insulating separators suitable for the separation of the electrodes of an electrolytic capacitor.

The problem arising in connection with the manufacture and operation of electrolytic capacitors, particularly on alternating current and of the coiled type wound with a separator, is stated in the Claassen U.S. Patent No. 2,220,887—second and third paragraphs, page 1 of the specification.

This problem, broadly speaking, is to produce an electrolytic capacitor of the narrow-spaced, generally coiled electrodes type designed for operation with a freely flowing electrolyte, since thereby a wider range of applicability of the capacitor is secured. Electrolytic capacitors are being manufactured in large quantities for operation with highly viscous electrolytes. Such capacitors cannot be used on alternating current power lines since a highly viscous mass does not allow of the heat generated being dissipated and the necessary cooling is absent. Thus, at least for alternating current operation, a free-flowing electrolyte is essential. This involves a difficulty because, if the electrolyte be free-flowing, immediate contact between the separator material and the anodized film is unavoidable and consequently the material of the separator has to be so chosen as not to affect the condenser destructively when it contacts the anodic film.

It is an object of the invention, therefore, to provide a novel type separator suitable for use, for example, in electrolytic capacitors in which a liquid electrolyte is utilized.

A further object of the invention is to provide a separator wherein is obtained both porosity and a material such as will secure adequate heat dissipation even with a separator of minute thickness—order of 0.001" to 0.005"—and thus make feasible "miniaturized" A.C. capacitors.

A still further object of the invention is to provide for this purpose a porous separator comprising glass wool or fluff which can be woven or felted to produce a textile fabric, such as "Fiberglas," in such composition as to obviate destructive changes of the surface of the filmed electrode of a capacitor when associated therewith; and, more specifically, not to interfere with the self-healing property of the capacitor.

Another object of the invention is to provide a material comprising glass wool but free of its toxic and other physically objectionable properties.

Still another object of the invention is to provide a separator comprising Fiberglas or like filamentary foraminous material and having an adherent coating of polyethylene of minute thickness.

Another object of the invention relates to the method of producing a suitable dispersion for a separator coating of the character described.

The invention has for an object, also, to afford a relatively inexpensive separator and one which lends itself particularly to the commercial production of electrolytic capacitors.

I am aware that various inert substances have heretofore been proposed, among others glass wool as well as polyethylene fiber. However, I have found that the first-named material alone does not achieve the aforesaid objects, but, if used in combination with a polyethylene coating of a specific nature, the desired result is attained. It is to be noted, furthermore, that while polyethylene alone may be used, it has the objectionable feature that the operation of the capacitor is limited to a much lower temperature range than when the polyethylene is reinforced by glass fiber, as is hereinafter more fully set forth.

Also, under operation at temperatures substantially above those at which the polyethylene begins to soften, the glass fiber provides rigidity of structure and protection against shrinkage, allowing the capacitor to operate safely and satisfactorily.

Moreover, in accordance with the invention, the polyethylene is combined with the glass wool in a manner which will render the latter readily manipulable for commercial manufacture of capacitors, etc., as well as eliminating handling difficulties with respect to toxicity.

The nature of the invention, however, will best be understood when described in connection with the accompanying drawings, in which:

Fig. 1 is a fragmentary view in isometric projection, and on an exaggerated scale, illustrating the novel separator associated with anodes of an electrolytic capacitor; and Fig. 2 is a similar view of a treated filament representative of those of which the separator is constituted.

Referring to the drawings, the novel separator is indicated as a mat 10 composed of monofilaments 11 (shown in detail, Fig. 2) of glass wool known commercially as "Fiberglas"; and no claim is made herein to this material per se. However, I have determined that, by suitably coating the same and other materials of like nature, they may be used effectively as separator means between the electrodes of electrolytic devices. One such application is indicated in Fig. 1 in which the separator mat 10 is included between and contacts two anodized electrodes 12 and 13 designed for use in a nonpolarized electrolytic capacitor (not shown). To this end, leads 14, 15 are shown connected respectively to said electrodes, as is well understood in the art.

For the reasons hereinbefore noted, it is not possible to make use of the strip of matted material 10, when untreated, for operation in, for example, an electrolytic capacitor in association with the two said electrodes 12, 13. However, if the strip of Fiberglas be first treated by coating the individual filaments 11 thereof with a dispersoid such as of polyethylene, the strip may be made to retain its porosity as well as to assume a manageable form for assembly purposes with the said electrodes. To this end, the polyethylene is dissolved in a suitable organic solvent such as a ketone higher than acetone, preferably methyl isobutyl ketone, to obtain a very fine dispersion of the polyethylene. I have discovered that ketones of a very high order of molecular weight—much higher than, for instance, said methyl isobutyl ketone—do not produce satisfactory solutions and suspensions of polyethylene because of the tendency of such higher ketones to effect coalescing of the coating which results in too little porosity and so a too-high resistance and in high power loss in the capacitor. Thus, to secure the desired porosity through satisfactory dispersion of the polyethylene, the latter is dissolved in said ketone by conventional means so as to obtain at a temperature of approximately 60° C. a clear saturated solution.

The aforesaid insulating separator material is sprayed with or dipped into this bath and then withdrawn for removal of excess solution as by allowing the same to drip off, by centrifuging, by means of warm air blasts, or otherwise. After this, minute discrete particles 16 of the polyethylene form, upon evaporation of solvent, and adhere to the individual fibers thus making up a heterogeneous mass of glass fiber and polyethylene, which fibers become bound together into a workable medium, permeable to the electrolyte as well as adequately coated. Such coating, it will be understood, may be made of relatively minute thickness—the combined coating and mat ranging in finished thickness of strip from 0.001" to 0.005".

As the wettability of polyethylene by the electrolyte is relatively low, being lower than that of the anodized electrodes, thus tending to prevent the electrolyte from adhering to the glass and facilitating its penetration to the entire surface of the dielectric film, a very thin coating is sufficient.

I claim:

1. A highly porous separator for use with electrodes of electrolytic devices containing liquid electrolytes consisting essentially of a foraminous mat of glass fibers having a porous integrating coating formed of discrete particles of a dispersoid permitting free access of the electrolyte to the electrode, said dispersoid having a wettability by the electrolyte lower than that of the electrode.

2. A separator according to claim 1, wherein the mat comprises fine glass filaments.

3. A separator according to claim 1, wherein the coating is polyethylene in finely dispersed condition.

4. A separator according to claim 3, wherein the polyethylene coating is of minute thickness.

5. A highly porous separator for use with electrodes of electrolytic devices comprising woven glass filaments having an adherent coating of polyethylene in finely dispersed condition.

6. A separator according to claim 5, wherein the combined thickness of coating and woven glass filaments ranges from 0.001" to 0.005".

7. A porous insulating spacer for an electrolytic capacitor having a plurality of electrodes at least one of which is anodized and a liquid electrolyte, said spacer comprising a foraminous layer of integrated fiber-like inorganic non-conducting material the individual filaments of which are discretely covered with a thin coating of chemically inert organic material having a lower wettability by the electrolyte than that of the anodized electrode.

8. A spacer as defined in claim 7 wherein the inorganic material is filamentary glass.

9. A spacer as defined in claim 7 wherein the organic material is a plastic permitting free flow of the liquid electrolyte to and from the electrodes of a capacitor.

10. A spacer as defined in claim 7 wherein the organic material is polyethylene.

11. A spacer as defined in claim 10 wherein the inorganic material is filamentary glass.

12. The method of forming a separator for use in an electrolytic device having an anodized electrode and an electrolyte of the character described, which consists in dispersing upon a mat of glass fibers a thin porous coating of a polymerized plastic material having a lower wettability in said electrolyte than that of said electrode and suspended in a volatile organic solvent to which it is inert, and permitting the solvent to evaporate leaving discrete particles adhering to said fibers the wettability of which particles is lower than that of said anodized electrode.

13. The method of forming a separator as set forth in claim 12 wherein the plastic material is polyethylene which has been heated to about 60° C.

References Cited in the file of this patent

UNITED STATES PATENTS

| | | |
|---|---|---|
| 2,199,519 | Collins | May 7, 1940 |
| 2,310,932 | Brennan | Feb. 16, 1943 |
| 2,551,869 | Brennan | May 8, 1951 |
| 2,593,922 | Robinson | Apr. 22, 1952 |
| 2,647,079 | Burnham | July 28, 1953 |
| 2,759,132 | Ross | Aug. 14, 1956 |